UNITED STATES PATENT OFFICE.

JONAS W. AYLSWORTH, OF EAST ORANGE, NEW JERSEY, ASSIGNOR TO CONDENSITE COMPANY OF AMERICA, OF GLEN RIDGE, NEW JERSEY, A CORPORATION OF NEW JERSEY.

PROCESS OF PRODUCING INDURATED ARTICLES.

1,111,286.  Specification of Letters Patent.  Patented Sept. 22, 1914.

No Drawing.  Application filed July 14, 1911.  Serial No. 638,557.

*To all whom it may concern:*

Be it known that I, JONAS W. AYLSWORTH, a citizen of the United States, and a resident of East Orange, county of Essex, and State of New Jersey, have invented certain new and useful Improvements in Processes of Producing Indurated Articles, of which the following is a description.

My invention relates to the production of indurated articles of various kinds.

The object of my invention is to impregnate wood, fabrics, and other porous substances, such as cement, plaster of Paris, stucco, and the like, for a great variety of uses in the arts with such substances and in such a manner that the wood or other porous substance treated is rendered hard, dense and proof against many deleterious agents, while at the same time the article treated may be rendered highly ornamental and greatly increased in strength.

My invention consists in an improved method for the production of such articles and in articles produced according to my improved process and constituting novel articles of manufacture.

By my invention a hard infusible phenolic condensation product is formed *in situ* within the pores of the substance treated. Various methods have heretofore been proposed for producing articles of this character. My improved method differs from all of these in operation and results in that, by it, the impregnation is more rapidly produced and the article uniformly hardened throughout its mass, thereby even in the case of massive objects such as logs of wood, railroad ties, and the like.

My process consists in saturating the structure of the wood or other porous object to be treated, with a solution of a salt containing the methylene radical, $CH_2$, the salt being one which will act as a hardening agent for phenol or fusible and soluble phenolic condensation products by reaction of the methylene therewith upon sufficient heating. This solution is caused to thoroughly impregnate the structure to be treated after which the latter is dried free of moisture. The body is then soaked in a soluble and fusible phenolic condensation product or compound of the same with a suitable solvent, until the same has thoroughly penetrated the porous structure, after which the body is heated at or above the reaction temperature of the phenolic and methylene containing substances, sufficiently to cause reaction between the same and an infusible, insoluble phenolic condensation product to be formed within the pores of the substance, thus producing the desired result.

The methylene-containing salt, within a solution of which the body is first soaked, may be hexa-methylene-tetra-amin, $(CH_2)_6N_4$, or salts of the latter, such as its carbonate, acetate or chlorid, or other suitable methylene-amin compounds or derivatives. Or polymerized formaldehyde may be used, or formaldehyde in suitable solution may be used in which case the polymerized formaldehyde, such as tri-oxymethylene will be formed within the pores of the substance being treated upon the subsequent drying out of the solvent. The phenolic substance, within a solution of which the body to be treated is subsequently soaked, may be a soluble, fusible, phenolic condensation product, such as the phenol resin described in my Patent No. 1029737, granted June 18, 1912, entitled Fusible phenol resin and method of forming same, or other substances of the same class, such as various of the well known "shellac substitutes". This product may be dissolved in a suitable volatile solvent which is driven off during the subsequent reaction, or a suitable solid solvent may be used. The solid solvent used should be one in which the phenol resin dissolves and becomes sufficiently thin upon heating to readily penetrate the pores of the body to be treated, the solvent remaining in the condition of solid solution or as a compound with the final infusible condensation product after the latter has been formed by reaction of the fusible phenolic body with the methylene-containing substance, as stated. Many examples of such solid solvents are given in my application Serial No. 496,060, of which my patent referred to is a division, and they include various organic acid anhydrids, chloro phenols, chloro and nitro derivatives of naphthalene, and phthalic and benzoic acids, the anhydrids of which are included within the designation of organic acid anhydrids mentioned above. The particular phenol resin which I described in my patent referred to and which may well be employed in practising my present invention, contains no formaldehyde or other methylene compound, in uncombined form, and will not harden to form the infusible product on any amount of heating, if not mixed with a methyleneating agent therefor. I may use this or similar substances or the same with varying proportions of free phenol compounded therewith.

The first impregnation, that with the methylene-containing salt, may be of only a superficial character or it may be thorough and deep, if desired. In the first case, it may be accomplished by soaking or boiling the substance to be treated in the methylene-containing salts and subsequently drying the body to render the same free of water. The structure is then soaked in the phenolic fusible soluble product, as stated In the second case, when the impregnation should be more thorough, both the first and the second impregnation may be assisted by vacuum and pressure treatment and subsequent drying. The second impregnation, that with the phenolic resin, should be carried on at a temperature less than that at which reaction with the methylene-containing substance takes place, this impregnation being carried out at a temperature preferably of from 170 to 210° F. After the pores of the structure have thus been filled with a mixture of the reacting substances, the structure may be heated for a sufficient length of time to a temperature at or above the reaction temperature required for the particular composition used, which may readily be determined. This temperature will range from about 210° F. upward. The wood or other structure treated may be dyed or colored simultaneously with either the first or the second stage of the impregnation.

In practising the invention, the quantity of the phenolic or cresolic fusible condensation product which the structure of the object to be treated will take up, is first ascertained by trial, and the quantity of hardening or methyleneating agent for this quantity, is then determined. The object is then impregnated with a solution of the methylene-containing agent of such strength that approximately the quantity of methylene-containing salt will be left within the structure after drying to produce the desired degree of hardness in the object, or render the compound within which the body is subsequently to be soaked, infusible and insoluble. After the body is thoroughly impregnated with the desired quantity of methylene-containing salt, it is soaked in the phenolic solution, as stated, and reaction subsequently caused to ensue. This method causes a very thorough impregnation in the case of wood and similar porous substances because the pores of the substance are opened and the substance thereby swelled by the aqueous methylene-containing solution, when the body is soaked therein, and the hardening agent remains in the pores after the drying out of the body and thus holds the pores open.

As stated, a fusible soluble phenolic condensation product should be used for the second impregnation. If hexa-methylene-tetra-amin or the like is used in the first impregnation, it would not be advisable to use phenol or cresol alone for the second impregnation in place of the fusible phenol resin, because of the greater quantity and expense of the methylene-containing salt which would have to be used in the first impregnation to harden the phenol. Hexa-methylene-tetra-amin combines with the phenol resin described by me, in the proportion of from about 7 to 12 per cent. of the resin to form a final infusible, insoluble product, and a quantity of from about 5 to 10 per cent. of the polymerized formaldehyde if the latter is used instead of the hexa-methylene-tetra-amin, such a polymerized formaldehyde being, for example, tri-oxy-methylene, as stated, the proportion being of the weight of the phenol resin, combines with the resin to form a final infusible, insoluble product. If a relatively large quantity of free phenol is combined with the resin, the methylene-containing salt or body must be correspondingly increased. Wooden and other objects treated as described, are greatly improved in the various qualities mentioned and also in appearance, a fine finish being given thereby to the surfaces of many woods. Cheap soft woods thus treated are very useful for flooring and furniture, the finish remaining the same, regardless of the wear of the surface. It may be noted that hexa-methylene-tetra-amin and its compounds do not form gases, so that these substances can only be used for impregnation in a solution process, such as that described. My present process also has the advantage over a process of impregnation by soaking the object in a dissolved mixture of phenolic and methylene-containing elements or of partial condensation products of the same, or of a solution of fusible phenolic condensation products, and added methylene-containing elements, that by it the solutions used may be made as readily fluid as desired, to easily penetrate the pores of the substance, while with the mixtures of ingredients, such as referred to, a sufficient fluidity is difficult to attain, and premature hardening by reaction is apt to ensue, upon heating, before the impregnation is complete.

Having now described my invention what I claim as new and desire to protect by Letters Patent is:—

1. The process of indurating porous structures, which consists in first soaking the structure in a solution of hexa-methylenetetra-amin until the same is impregnated therewith, drying the same free of water, then soaking the structure containing the methylene-amin compound in a solution of a soluble, fusible phenolic condensation product until the same is impregnated therewith, and heating the structure sufficiently to cause a reaction between the said phenolic product and the said hexa-methylene-tetra-amin, and an infusible hard insoluble condensation product accordingly to be formed within the porous structure, substantially as described.

2. The process of indurating porous structures, which consists in determining the quantity of a soluble phenolic condensation product which the structure to be treated will retain upon impregnation therewith from solution, determining the proper quantity of methylene-containing hardening agent for the same, soaking the structure in a solution of the desired hardening agent of such strength and under such conditions as to leave approximately the desired amount of such agent within the pores of the structure, upon drying the same, drying, soaking the structure in the determined solution of the phenolic condensation product, and heating the structure sufficiently to cause a reaction between the said phenolic product and the hardening agent and an infusible, hard insoluble product accordingly to be formed within the porous structure, substantially as described.

3. The process of indurating wood which consists in first soaking the same in a readily-fluid solution of hexa-methylene-tetra-amin until the fiber is impregnated therewith to a desired extent, drying, and then soaking the wood in a solution of a fusible, soluble phenol resin, at a temperature not greater than 210° F., until the same has thoroughly penetrated the structure, and then heating the wood sufficiently to cause a hardening reaction to take place between the phenol resin and the hexa-methylene-tetra-amin within the structure of the wood, substantially as described.

This specification signed and witnessed this 12th day of July 1911.

JONAS W. AYLSWORTH.

Witnesses:
DYER SMITH,
HENRY SHELDON.